United States Patent
Martin et al.

(10) Patent No.: US 12,206,203 B2
(45) Date of Patent: *Jan. 21, 2025

(54) MODULAR CONSUMER-CONFIGURABLE ELECTRICAL FIXTURE SYSTEM

(71) Applicant: POWER TRANSFORMATIONS LLC, Richmond Hill, GA (US)

(72) Inventors: Clyde Martin, Atlanta, GA (US); Jonathan Johnson, Richmond Hill, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/426,326

(22) Filed: Jan. 29, 2024

(65) Prior Publication Data
US 2024/0170884 A1    May 23, 2024

Related U.S. Application Data

(63) Continuation of application No. 18/110,358, filed on Feb. 15, 2023, now Pat. No. 11,888,256, which is a continuation of application No. 17/693,257, filed on Mar. 11, 2022, now Pat. No. 11,588,270, which is a continuation of application No. 17/218,799, filed on Mar. 31, 2021, now Pat. No. 11,276,954.

(60) Provisional application No. 63/003,949, filed on Apr. 2, 2020.

(51) Int. Cl.
*H01R 13/514* (2006.01)
*H01R 13/70* (2006.01)
*H01R 31/06* (2006.01)

(52) U.S. Cl.
CPC ........... *H01R 13/514* (2013.01); *H01R 13/70* (2013.01); *H01R 31/065* (2013.01)

(58) Field of Classification Search
CPC ..... H01R 13/514; H01R 13/70; H01R 31/065
See application file for complete search history.

(56) References Cited

U.S. PATENT DOCUMENTS

| | | |
|---|---|---|
| 4,485,282 A | 11/1984 | Lee |
| 7,798,830 B2 | 9/2010 | Schneider |
| 8,287,305 B2 * | 10/2012 | Sil .................. H01R 13/443 439/535 |
| 9,437,978 B2 * | 9/2016 | Green ............... H01R 13/652 |
| 10,655,656 B2 * | 5/2020 | Franklin ............ H01R 13/73 |
| 10,777,948 B2 * | 9/2020 | Thaker ............. H01R 27/02 |
| 2002/0072272 A1 * | 6/2002 | King ............... H01R 13/7135 439/535 |
| 2009/0180261 A1 | 7/2009 | Angelides |
| 2012/0094511 A1 * | 4/2012 | Sil .................. H01R 13/629 439/535 |
| 2016/0003270 A1 * | 1/2016 | Franklin ........... H01R 13/70 439/529 |

(Continued)

*Primary Examiner* — Abdullah A Riyami
*Assistant Examiner* — Nader J Alhawamdeh
(74) *Attorney, Agent, or Firm* — Clayton, McKay & Bailey, PC

(57) ABSTRACT

Described herein is a modular outlet system that provides flexibility in locating switches, outlets, and sensors. A base can be recessed into a surface, such as a wall, floor, or ceiling and can be connected to a power source. The base can accept multiple types of inserts. The inserts can include switches, outlets, sensors, and blank plates. The inserts can lock into place with the base and unlock based on manipulation of a recessed button. Inserts can engage the base with staged gate opening to minimize chances of electrical shock.

20 Claims, 7 Drawing Sheets

(56) References Cited

U.S. PATENT DOCUMENTS

| | | |
|---|---|---|
| 2016/0233605 A1 | 8/2016 | Ramiraz |
| 2017/0310061 A1 | 10/2017 | Riner |
| 2018/0342845 A1 | 11/2018 | Calabrese |
| 2019/0027876 A1* | 1/2019 | Murahari ............. H01R 13/741 |
| 2020/0006902 A1* | 1/2020 | Thaker ................. H01R 25/003 |

* cited by examiner

MODULAR CONSUMER-CONFIGURABLE ELECTRICAL FIXTURE SYSTEM

CROSS-REFERENCE TO RELATED APPLICATIONS

This continuation application claims priority to U.S. patent application Ser. No. 18/110,358, titled "Modular Consumer-Configurable Electrical Fixture System," filed Feb. 15, 2023, which is a continuation of application Ser. No. 17/693,257, titled "Modular Consumer-Configurable Electrical Fixture System," filed Mar. 11, 2022, which is a continuation of U.S. patent application Ser. No. 17/218,799, titled "Modular Consumer-Configurable Electrical Fixture System," filed Mar. 31, 2021, which is a non-provisional application that claims priority to provisional application No. 63/003,949, titled "Modular Consumer-configurable Electrical Outlet System," filed Apr. 2, 2020, each of which is also incorporated by reference in its entirety.

BACKGROUND

Electrical fixtures, such as switches and outlets, are typically installed by an electrician and directly connected to a building's power supply. However, this limits the changes that can be made to outlets and fixtures after the fact since a user must pay an electrician or risk electric shock. Replacement can also require the assistance of at least one other person to (among other things) hold the fixture itself while the installer strips, twists together, and safely connects multiple pairs of bare wire ends, and finally mechanically attaches the fixture to the structure.

The burdens of the conventional method fall on both residential and commercial users. Residential users typically install or change fixtures infrequently, partially due to the complexity and difficulty of the conventional process. Commercial users face the repeated cost of unwiring and rewiring fixtures. This burden may be particularly felt in industries where fixtures are often updated to match changing decor, such as in the hospitality or restaurant industries.

Users often want to customize their home to their own personal tastes. Builders waste a lot of money outfitting a home with standard outlets and switches only to have a user replace the outlets and switches with more stylish varieties later. Additionally, users are limited regarding changing the type of fixture that exists at a particular location. If they could do so more easily, they would likely customize the placement and types of electrical fixtures.

In view of at least the above shortcomings, a need exists for a modular consumer-configurable electrical outlet system.

SUMMARY

A modular power outlet system includes two parts: A base, which permanently wires into a standard sized electrical box located in a wall, ceiling, or floor, and the insert. There are many different types of insert. For instance, one type of insert may include one or more 110V AC outlets for appliances, and/or one or more USB outlets. The insert could include a switch. Most of the inserts are wireless enabled, so that a switch in one insert may control a device on the same wireless network. Yet another type of insert may include a switch that communicates with other devices such as floodlights, etc. It is also envisioned that inserts may be designed that include video cameras, loudspeakers and drivers, status display screens, and other more advanced devices.

To allow for modularity the base include a projection with a locking mechanism for purposes of mating with inserts. The projection can be located within an inner cavity of the base, such that it does not interfere with, for example, a blank face plate when the base is not in use. The locking mechanism of the base can include no moving parts in an example, and instead the projection can include recesses that are joined by moving parts of a male locking mechanism of an insert. For example, the male locking mechanism can include latches (e.g., pinchers or tongs) that snap into the recesses of the female locking mechanism of the base. Alternatively, the male and female locking mechanism roles can be reversed, with moving parts (e.g., latches) being included with the base instead of the insert.

The system can include different types of inserts. One such insert is an outlet insert. The outlet insert can mates with the base and including a first recessed button to disengage from the locking mechanism of the base. The button can be a pin (also called a piston) that resides beneath the surface of the insert, in an example. The button can be pressed with a first force that is applied in an opposite direction from a direction of removal. This can cause a piston to disengage the male locking mechanism, such as by causing the latches to open and withdraw at least partially from the recesses of the female locking mechanism. The user can disengage the male locking mechanism by pushing the button inward on the insert, while pulling outward on the insert to disengage the insert from the base.

The modular system can in this way allow for swapping out the first (e.g., outlet) insert for a second insert without any modifications to the base and without having to turn off power to the base or other such intrusive measures. For example, a switch insert can be mated with the same base. The switch insert can control the supply of power from the base a separate apparatus. In this way, the base can be wired to operate as either a switch or an electric outlet. This can provide a property owner with unique flexibility in reconfiguring their existing electrical system without having to hire an electrician to do so.

The locking mechanism can include a projection that is part of either the base or the insert, depending on the example. In one example, the projection is centrally located within the base. Each insert (e.g., outlet insert and switch insert) can mate with the projection with its portion of the locking mechanism, which can include latches that hold onto the projection. For example, the outlet insert and switch insert each include a latch that operates perpendicularly to the direction of removal of the insert. The latch can mate with a channel in the projection of the base. The projection can also include an electrical terminal that the insert engages while mated.

Engaging the insert to the base can generate a click sound, indicating proper engagement. When the insert is being pressed into the base, a ground pin can engage prior to a neutral pin prior, which in turn can engage prior to an electrical pin engaging with a live electrical terminal through an access port of the base.

A button of the locking mechanism can allow for disengaging the insert from the base. For example, the insert can include a hole for accessing a recessed button for disengaging the insert from the base. The outlet insert and the switch insert can each include such a button (e.g., a first button and a second button). The recessed button can operate and disengage the two latches in one of the insert and the base.

In another example, the switch insert can control the supply of power to the separate apparatus. The separate apparatus can be a hard-wired apparatus, such as a ceiling fan. Power signals can also be digitally sent over the wiring of the structure, including hot wiring, in an example. Alternatively, the separate apparatus can be another insert that is mated with another base. Alternatively, the insert, such as a switch or sensor, can send wireless signals to control another insert, such as a camera or light. This can allow a user to create personal configurations of sensors where bases are installed, and change the configurations as needed.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this specification, illustrate several embodiments of the invention and together with the description, explain the principles of the invention.

DETAILED DESCRIPTION

Reference will now be made in detail to exemplary embodiments consistent with the invention, examples of which are illustrated in the accompanying drawings. Wherever possible, the same reference numbers will be used throughout the drawings to refer to the same or like parts.

The modular system can include an electrical box, face plate, base, and insert. As will be described, elements of the base and insert can allow for a set of modular inserts for use with the same base. This can allow, for example, a homeowner to replace a power outlet with a switch without calling the electrician.

Different inserts can include sensing, switching, power outlets, and blanks. A sensing insert can be, for example, a thermostat, light sensor, movement detector, person detector, or moisture meter. A switching insert can turn things on and off. A power outlet can have different numbers of plug inlets or prong receptacle configurations. The insert can include a WIFI module, allowing the insert to communicate with other components on the network.

Figure 1A:
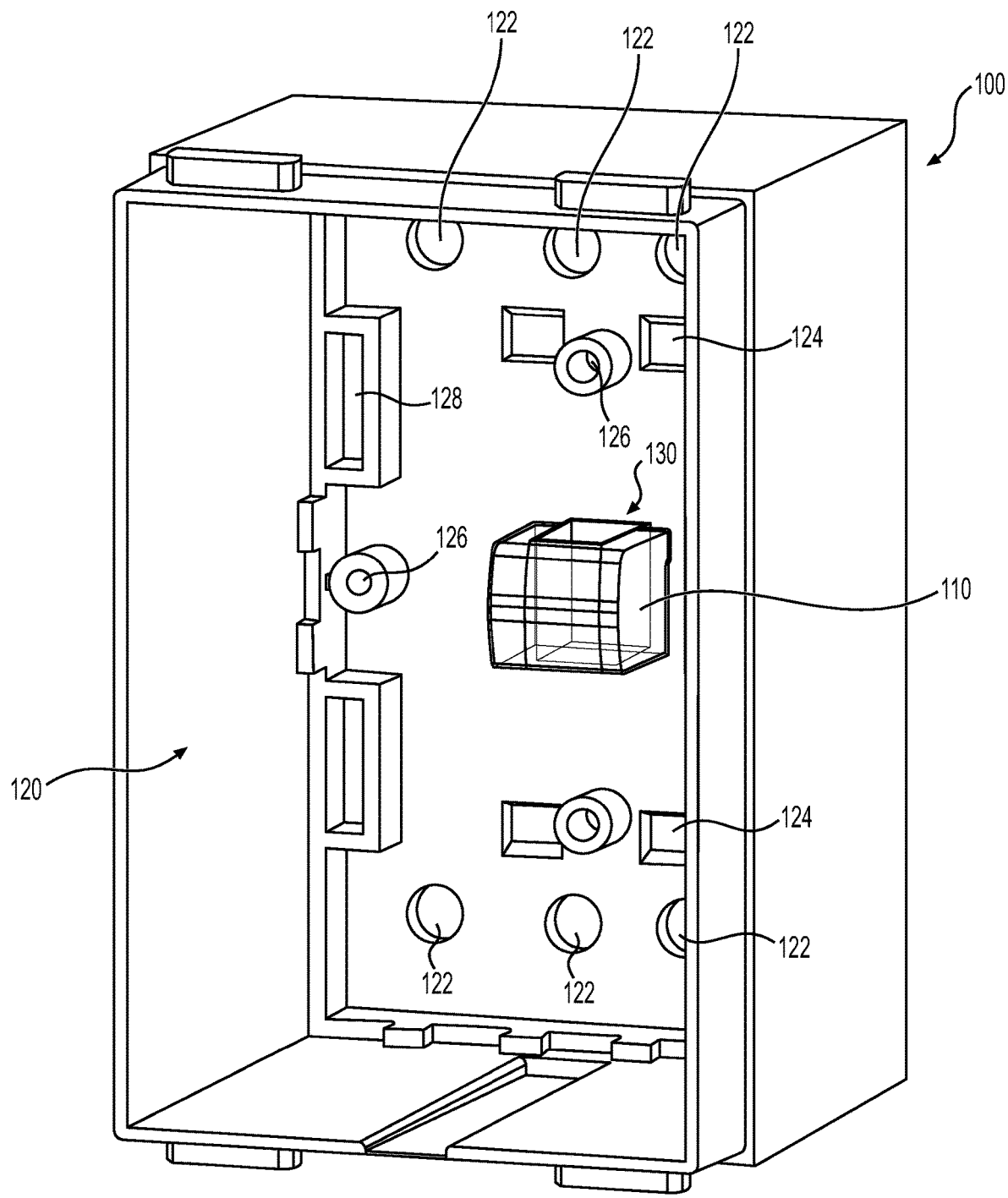
FIG. 1A is an example illustration of a perspective view of a base, showing an inner cavity of the base.

FIG. 1A is an example illustration of a perspective view of a base 100, showing an inner cavity 120 of the base 100. The base 100 can be installed in an electrical box in an example.

The electrical box can be metal or plastic. The electrical box can be fixed to the internal structure of a wall, ceiling, or floor, such as a wooden stud, a joist, a cinderblock, or a concrete structural element, via screws, anchors, nails, clips, as specified by various building codes. The electrical box may also be known as a junction box, a handy box. Wires are fed through the back or the side of the electrical box.

The base 100 can be inserted into the electrical box and can act as a universal adapter that allows for easily swapping out different inserts to use the same electrical box. The walls of the base 100 may be solid, or they may be vented or louvered for thermal management.

To connect the base 100 to the electrical box, main electrical wires can be connected to the posterior of the base 100 (on the other side of what is illustrated in FIG. 1A). The base 100 cab also be mechanically secured to the electrical box, such as by using screws or clips. Several holes 126 are shown in the inner cavity 120 for such purpose. The base 100 can include the mechanisms for securing to the electrical box, such as one or more screws, or mechanical clips or latches.

The electrical wiring can be connected to the back of the base 100 via a variety of methods. For example, the back of the base 100 can include a metal terminal with one hole drilled through for insertion of the stripped wire. The wire can be clamped into place using a screw tapped perpendicular to the wire entry. Alternatively, the stripped wire may be made into a hook shape and then trapped between the head of a screw and an electrode. Alternatively, spade connectors may be used. In another example, the wires may be poked into a receptor containing sharp metal teeth which grip and electrically connect with the wires. Alternatively, short internally attached wires may project from the base and be connected to the household wiring via a variety of means, such as by twisting and capping etc.

In one example, a printed circuit board ("PCB") on the back of the base can electrically connect the wiring from the house to a set of mechanically gated, electrical sockets located on the inside back face of the base. The PCB can also structurally support the connection electrodes and the wiring terminals. Alternatively, brass or other metal busses may be used to connect the base outlet terminals to the electrical supply. The electrodes and busses may be supported by a PCB or may be supported by molded plastic. The PCB in the back of the base 100 can electrically connect the wiring from the house to a set of mechanically gated, electrical sockets located on the inside back face of the base 100, in an example.

Once secured inside the electrical box, the base 100 can be electrically tamper-resistant, and safe to touch. For example, electrical terminals may be recessed behind access ports 122. The access ports 122, which can shield electrical terminals, can also be mechanically gated in an example. In one example, the access ports 122 can provide access to different wires that either lead to different electrical boxes within the dwelling or have differing voltage levels at the respective electrical terminals.

This can allow for inserting different inserts 100 that have different electrical contact orientation, depending on the function or power requirements of the insert. For example, a switch insert can have an electrical contact that relies on switch position for making contact with a terminal of the base 100 that is wired to a ceiling fixture, whereas an outlet fixture can provide constant contact to that terminal. Likewise, a sensor insert that draws less power can use a different access port 122 dedicated to a lower voltage. Alternatively, an outlet insert for use with a dryer might use different access ports 122 dedicated to a 220 V source. The terminals can also provide different voltage levels than 110 to 120 V. In general, the voltage levels at the terminals can be any voltage level. This can allow for operation in different countries that have voltages in ranges of 110 to 240V at 50 Hz or 60 Hz.

Multiple power ports 122 can be used by a single insert 150, in an example. For example, an insert can have two electrical pins 165 that separately access 120 V power sources (or any other voltage level). This can allow for a multi-gang insert or an insert with multiple different switches and functions.

The gates of the base 100 can shield the female terminals at the back of the base 100 and by default the gates can be closed. The gates can be located inside ports 122 in the back inside face of the base and slide out of the way as the insert is being inserted and expose the terminals. Some gates are constructed to open in pairs as electrodes are inserted. In one example, the gates are designed in such a way that the electrical terminals are not exposed until after the ground (or earth) pin has been inserted. At that point, one electrode ("neutral") can first become exposed, followed by the live ("hot") and broken hot terminals, while the insert is being seated into place on inside the base. The neutral terminal can be more exposed (0.1-0.2 mm) than the hot terminal after the earth pin is inserted.

Different examples can use different techniques for opening the gates. For example, some part of the back of the insert can activate the gates by first entering through the support ports 124. In one example, a support member of an insert can pass through a support port 124, un-gating an access port 122 such that a conductive member of the insert can reach an electrical terminal behind the access port 122. Alternatively, engaging the locking mechanism of a projection 110 can cause the gates to open.

The base 100 can also include a projection 110 (also called a protrusion) for locking an insert into the base 100. The projection 110 can be located centrally on the inside back surface of the base, within the inner cavity 120. The projection 110 can include a male or female type locking mechanism, depending on the example. In FIG. 1A, the projection 110 includes channels 130 on the top and bottom of the projection. These channels 130 can be part of a female locking mechanism that accepts latches of the male locking mechanism of an insert. The projection 110 may be a square cuboid, a rectangular cuboid, a cylinder, a cylindrical shape with an oval cross section, a hexagonal prism, or another prism with a polygon cross section.

The projection 110 can have multiple functions in addition to helping lock the insert into the base 100, depending on the example. For example, the projection 110 can act as a guide for the insert during insertion, to prevent twisting or skewing when inserting the insert into the base 100. The projection 110 can also help stabilize the insert when unsymmetrical stress is exerted in use. For example, tripping over an appliance electrical cord can cause the rapid removal of an electrical plug from the insert face, subjecting the insert to strong asymmetrical forces. Inserting appliance plugs into the insert outlets and pulling them out again exerts mechanical stress through the insert-base system. Because the electrical outlets are offset from the center of the insert, the stress may have a strong torsional component. A central location of the locking mechanism can evenly redistribute mechanical stress in a symmetrical manner. In general, the projection 110 can help the insert maintain stability.

As mentioned, the centrally located projection 110 can also include the locking mechanism (male or female). This can include no moving parts in an example. Alternatively, the projection 110 can include part of the release mechanism in an example. In one example, the projection 110 enables the insert to be centrally and symmetrically locked into place using two latches that operate in a direction perpendicular to the direction of insertion and removal. The latches can be part of a male locking mechanism, whereas the channels that accept the latches can be part of a female locking mechanism. The projection 110 can include either type of locking mechanism (male or female). Other methods of locking can include latches on the outside edge of the insert that mate with notches 128 on the inside of the base 100.

In one example, the projection 110 may also include one or more electrical contacts, such as the earth or ground electrode. This can allow for electrical connection through the projection, such as by the latches including a conductor that contacts an electrical terminal. In another example, the locating 110 projection may be coupled to the tamper resistant gates shrouding electrical connections when the insert is not in place, such that the gates open as the insert is being positioned and locked into place.

As an aid to alignment means, the base 100 can have a key molded into the structure that corresponds to a key on the insert to ensure correct alignment. The key molded into the base may be a negative cavity, such as connection ports 124, and the insert may have a positive cavity, or vice-versa. These ports 124 can assist with proper alignment and stability of the insert.

While in this example the central locking projection 110 projects from the inside surface of the base 100 and is designed to insert into a similarly shaped negative cavity on the back of the insert, an alternate option is to incorporate the central locking projection onto the back face of the insert, and have the corresponding cavity incorporated into the base 100.

Figure 1B:
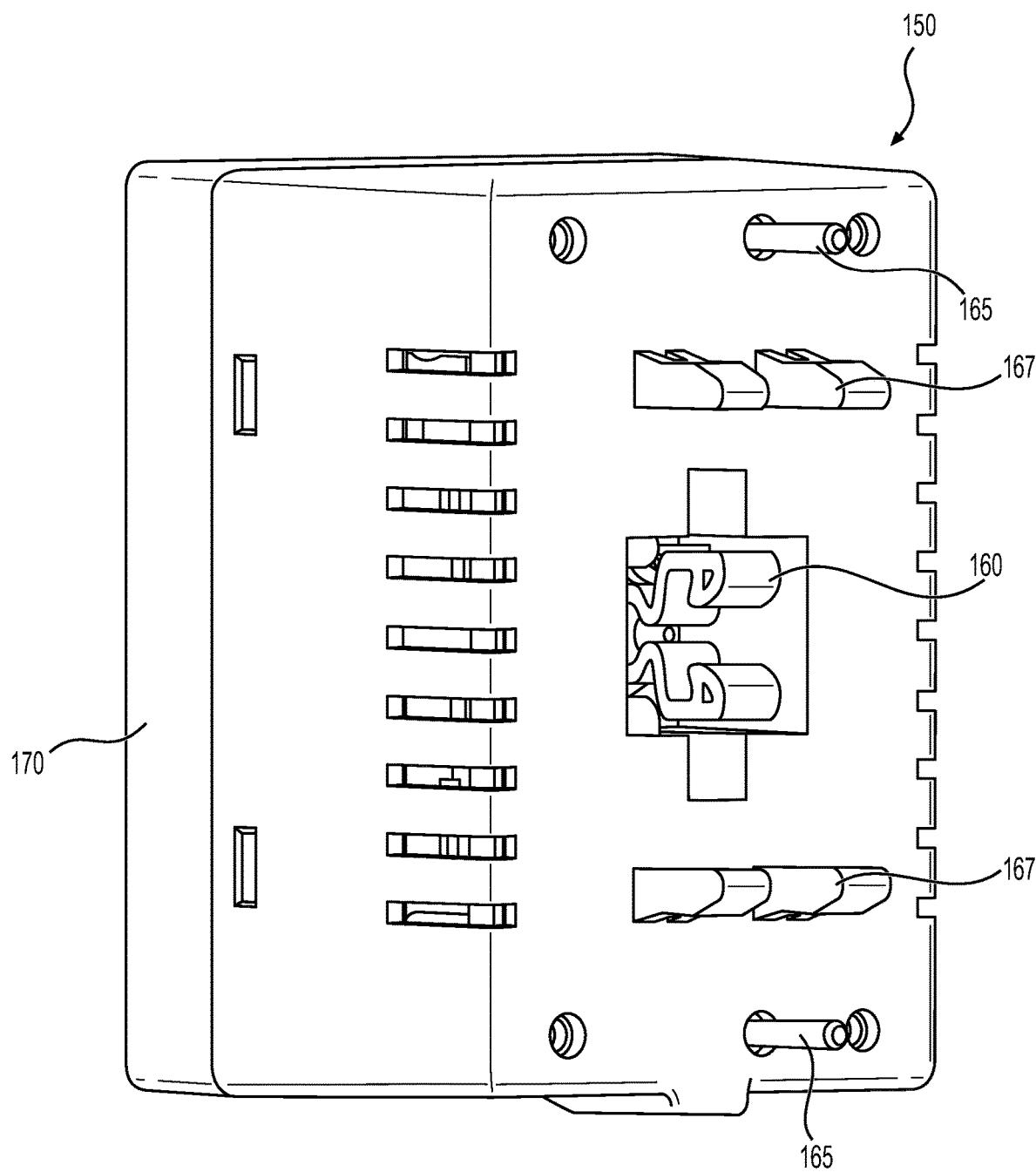
FIG. 1B is an example illustration of a perspective view of an insert, showing a posterior side of the insert for fitting into an inner cavity of the base.

FIG. 1B is an example illustration of a perspective view of an insert 150, showing a posterior side of the insert for fitting into an inner cavity 120 of the base 100. The insert 150 can be one of several types of inserts that mate with base 100. The insert 150 can lock into place within the base 100, connecting electrically with the electrical terminals of the base 100 without need for professional installers. In the example shown in FIG. 1B, male locking mechanism 160 can include latches for mating with the female locking mechanism 110 of FIG. 1A. For example, insert 150 can include two opposing latches, which can be formed springs made out of thin spring steel sheet stock. The springs can be metal but can alternatively be made from other materials, such as plastic. Additional structural protrusions 167 can mate with structural ports 124 of FIG. 1A, and electrical contacts 165 can engage electrical terminals through access ports 122 of FIG. 1A. The locking mechanism of the insert 150 can include moving parts necessary to securely lock into the base 100.

In general, the inserts can be functional electrical components, such as switches, electrical outlets, cameras, and other devices that mate with the base 100. The insert 150 itself can have different features on the front face 170, such as a switch, outlet, camera, sensor, or the like. Each insert 150 may include a wide variety of functional devices. Likewise, the electrical contacts 165 can vary in location according to the purpose of the insert 150. These electrical contacts 165 can align with the different access ports 122 of the base 100. These ports 122 can provide access to different electrical paths and even different power levels, in an example.

By selecting specific inserts, building occupants can customize their electrical device configuration. For instance, one base 100 may house an electrical outlet insert 150, while another base 100 might contain a switch insert 150 that wirelessly operates an apparatus. The apparatus can be, for example, a remote light (which can be provided by another insert in another base). The occupant may elect to move or replace the inserts to better suit their own needs and tastes, which can change over time. Subsequent owners also can easily reconfigure which inserts 150 are located at which locations without a professional installer Four types of inserts 150 discussed herein can include electrical outlets (power delivery modules), switching inserts, sensing inserts, and blank inserts. The electrical outlet can supply alternating current ("AC") high voltage power outlet, in one example, such as a 110V AC. Alternatively, the electrical outlet insert can supply direct current ("DC") low voltage power outlet (e.g. USB-C). To access different power levels for these different uses, the inserts 150 can have different electrical contact 165 configurations that align to the different access ports 122 of the base 100. The electrical outlet inserts can be network enabled and smart switchable, in an example. For example, the insert 150 may take instructions wirelessly to switch power to another device on or off. The insert 150 can provide wireless power transfer in an example or may be "dumb" such that the power is always on. The outlet itself can be provided on the front face 170 of the insert 150.

The insert 150 can also be a switch insert. The switch insert can provide any switching mechanism on the front face 170. The switch insert can produce a signal that controls another device in wireless communication, in one example. Alternatively, the switch insert can independently sense a condition and controls power to another device. For example, the switch can include a thermostat, a timer, a photometer to control lights off at dawn, and a motion detector to save air conditioning power, among other possible features.

The switch insert can also provide a manual switch in an example. For instance, the switch insert can include a rocker switch, a toggle switch, a radio button, a knob, a dial, or some other physical mechanism. The switch can then control another device in wireless communication, such as a loudspeaker, a floodlight, and a garage door.

In another example, the switch insert can directly turn power on and off at another device through a hard wire ("broken hot") that is connected to the base 100. For instance, another base 110 can house an insert for a waste disposal system an extractor fan, with the second base 100 being wired to the first base 100. The switch insert at the first base 100 can control whether power flows from the first base 100 to the second base 100. To do this, the switch insert can connect power from the electrical box that the base 100 resides within to a terminal beneath one of the access ports 122 of the first base 100. That terminal can allow power to then flow to the second base 100, in an example, powering the insert 150 of that base.

The switch insert can also communicate with a smart Power Delivery Module to cut or supply power to a remote device. This can be used to control, for instance, electrical lighting and lamps, lawn irrigation, and outdoor floodlights.

Another type of insert 150 is a sensing insert. Sensing inserts can report data over a wireless or wired network in an example. Examples include a remote temperature sensor, a baby monitor, a sensor for detecting a car approaching a garage door, a smoke detector, and others. When the sensor detects the particular phenomena, the sensor insert can respond in a preprogrammed manner. For example, the sensor insert can take action by dimming a light, triggering an alarm, or activating a door.

Any type of sensor is possible as a sensor insert. For example, the sensor could include visual, auditory, chemical, or motion sensing. The sensor can detect poisonous gasses (e.g., carbon monoxide) or flammable vapors (e.g., hydrocarbons, such as propane, butane, natural gas, or gasoline). Another type of sensor can detect a video image by a visible light or thermal camera. Still another type of sensor can include a microphone or other transducer that receives spoken or sound information.

Some combination of insert types is also possible. For example, the insert can be a virtual assistant, such as AMAZON ALEXA, that controls devices in the home, accesses the internet, and senses the user's presence, and plays audio through a speaker. Thermostats, video cameras, and processor-based devices can all be inserts, in an example. For example, when a homeowner is leaving for a trip, that can change out a switch insert to instead be a security camera insert.

A fourth type of insert is a blank module insert. The blank module insert can act as a space holder, protecting the base 100 from ingress of wall plaster, spackling, paint, varnish, etc. during construction. The blank module insert can be designed to blend into a finished wall for aesthetics purposes. This can allow the space to have a finished feel even before a builder or occupant decides which functional type of insert to place in a particular base 100. This can also spare builders from the expense and effort of providing switches, outlets, and other fixtures at some locations, instead leaving it up to the occupant to purchase and swap out the desired inserts 150. A blank insert may also be inserted to protect the base while painting or decorating. The blank insert may also be more aesthetically pleasing than an empty base 100 connector.

In one example, the inserts 150 are paintable. This can allow for customizing the colors of the inserts 150. This can apply to modular blank plate inserts 150 but also to any other insert 150 type.

Additional examples of inserts 150 may include 110V AC outlets, with or without ground pins; one or more low voltage USB outlets (e.g., USB-A, USB-C); one or more physically operable switches or buttons; a display screen; a Human Machine Interface (HMI); a camera; a microphone; a driver plus a loudspeaker; a thermostat; a light dimmer; and a home automation gateway power storage device (e.g., battery backup).

The insert 150 can also include sensors such as motion sensors; heat sensors; smoke sensors; sound sensors and microphones; babies crying; dog barking; car approaching garage; ultrasonic doppler sensors for detecting motion; glass breaking sound detection sensors; ambient temperature sensors; seismograph and accelerometer sensors; moisture or flooding sensors; carbon monoxide, or flammable gas sensors; and dust and air quality sensors (for example, that specify when it is time to change the air filter).

The insert 150 can control a wide range of devices remotely, such as: window blinds, lighting, door and window locks, televisions, attic fan, room fans, exhaust fans, alarms, door openers, and air conditioning units.

The insert 150 can also include facility to send and receive encoded information via any standard protocol, such as: Bluetooth, WiFi, ultrasound, via cellular service, or any other wired or wireless protocol. In one example, the insert 150 utilizes Powerline communication, such as by transmitting data through electrical wires of a house.

In some examples, inserts 150 can include a wireless communication protocol board that may send or receive instructions over, for example, Wi-Fi, Bluetooth, 5G. The communication network established can enable switches to operate other devices remotely on the same network. Wireless capability can also allow inserts 150 to broadcast information such as electrical usage, video information, and audio information. Such information may be encrypted or otherwise secured.

Figure 2A:
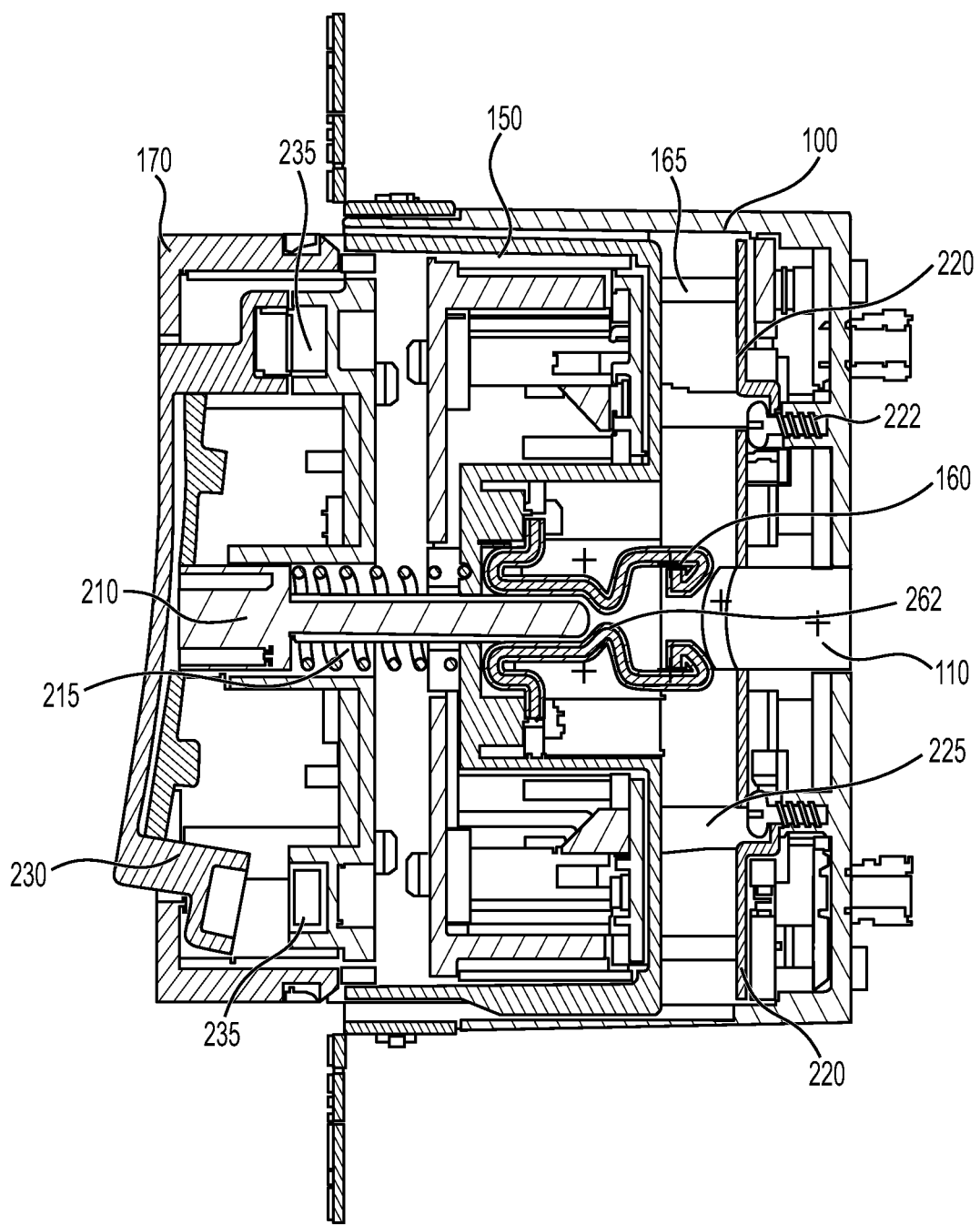
FIG. 2A is an example illustration of a cross-sectional side view of an insert and base, where the insert is not yet mated to the base.
Figure 2B:
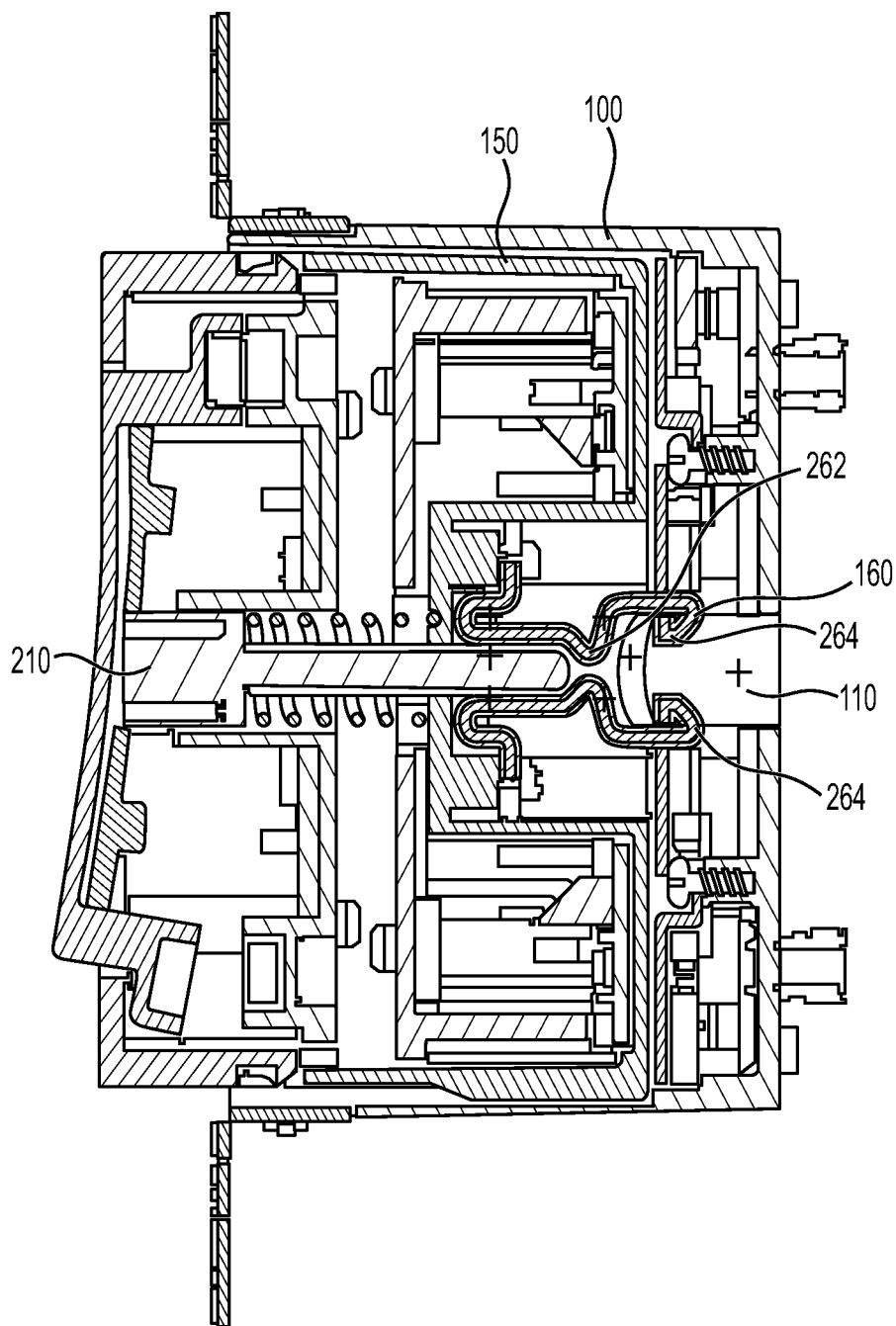
FIG. 2B is an example illustration of a cross-sectional side view of the insert and base, where the insert is mated to the base.

FIG. 2A is an example illustration of a cross-sectional side view of an insert 150 and base 100, where the insert is not yet mated to the base. FIG. 2B is an example illustration of a cross-sectional side view of the insert and base, where the insert is mated to the base. These figures are discussed regarding insertion and disengagement of an insert 150 with respect to a base 100.

Turning to FIG. 2A, insert 150 slides into base 100. The insert 150 of FIGS. 2A and 2B is a switch insert, having a switch 230 for engaging and disengaging electrical paths 235. These electrical paths 235 can conductively couple to terminals 220 accessed through the access ports 122 of the base 100, in an example. Alternatively, the electrical paths 235 can be used for triggering wireless signals from the insert 150, in an example.

The insert 150 of FIG. 2A includes a male locking mechanism 160 with latches for engaging with the protrusion 110 of the base 100. This insert 150 includes a one-motion insertion and locking feature. No screws or other fasteners are needed to secure the insert 150 to the base 100. Instead, insertion of the insert 150 is achieved by pushing the insert 150 into the inner cavity 120 of base 100 until the latches engage with the female locking mechanism. This engagement or another engagement (such as protrusion 225 with structural ports 124) can produce an audible click. The click sound can alert the user that the insert 150 has been successfully engaged to the base 100. In one example, the click produces a sound greater than 70 decibels ("dB") at one meter and greater than 80 dB at 30 centimeters from the insert 150.

An engaged insert 150 is shown in FIG. 2B. The latches 264 can be in place within recesses of the protrusion 110 of the base 100. Once engaged, the insert 150 can project from the base some short distance, such as less than 0.6 inches (15.24 mm), in an example. In some examples, the insert 150 can protrude further than 0.6 inches.

The push force required to lock the insert 150 in place can vary between examples and insert types. Some example force values in Newtons ("N") for inserting the insert 150 are shown in Table 1, below. The push force values can range from about 25 N to 70 N, depending on the example.

TABLE 1

Example push forces (N) for inserting an insert into a base

| Outlet Insert | Switch Insert | Blank Insert |
|---|---|---|
| 55 N | 38 N | 37 N |

Similar pull forces can be used to disengage the insert when the locking mechanism is also disengaged, in an example. In one example, the button (including a pin) can help disengage the insert and assist with the pull force, yielding a pull force in the range of 15 N to 70 N, depending on the example. Other push and pull forces are also possible.

The insert can give a re-assuring audible "click" or "snap" sound when the insert 150 is correctly locked in place. One example produces a double click, but it is perceived as one single click when the insert is used normally. In one example, the click can be heard as greater than 70 dB at one meter, and greater than 80 dB at 30 cm. Examples of click sound levels are shown below in Table 2. The click levels can range from about 25 dB to 70 dB, depending on the example.

TABLE 2

Example sound levels (dB) of locking "click" measured at 1 meter

| Outlet Insert | Switch Insert | Blank Insert |
|---|---|---|
| 69.4 dB | 71.2 dB | 71.9 dB |

In one example, the insert 150 is mechanically locked into the base 100 using latches 264 that travel perpendicular to the direction of insertion. The locking latches 264 may be incorporated into the base 100 or they may be incorporated as part of the insert 150. The locking mechanism allows inserts to be inserted into the base and locks the insert into place with an audible mechanically generated "click" or an electronic signal, such as an electronically generated audible tone or a flash of a light emitting diode ("LED"). The latches 264 may be housed in the central locating projection 110 (i.e., protrusion) incorporated into the structure of the base 100 in an example. Alternatively, the perpendicular latches 264 may be incorporated into the insert and engage with the central locating projection 110 of the base 100. Alternatively, the central locating projection 110 may be incorporated into the back face of the insert 150 and contain the locking devices 264 that engage with a cavity in the base 100.

The projection 110 can have a curved anterior tip that eases the spreading of the spring latches of the insert 150 when the insert 150 is pushed into the base. This can also help ensure that the alignment is corrected and the latches still function when alignment is initially imperfect.

In one example, the insert 150 will not allow insertion and locking if the insert 150 is upside down because the electrical pins 165 will not open the rear gates if the ground pin is not in the correct position to do so. Optionally, the insert 150 and the base 100 could have one or more complimentary notches and keys molded into the inside wall of the base and the casing of the insert to ensure correct orientation of the insert.

The locking latches 264 may be released by depressing a centrally located button 210. The button 210 can include a straight pin that causes the latches 264 to open by pressing on the male locking mechanism 160 at position 262. This can push the latches, which can be formed springs, such that the bend open. In this way, ejection of the insert 150 can be facilitated by the button 210, located centrally on the face of the insert. The button 150 may be recessed to avoid accidental unlocking of the insert. In one example, the button includes a straight pin of approximately 0.16" diameter, with a conical tip. To access the button 210 and release the insert, a tool is used to press the pin (i.e., button 210). The tool can be poked through an access hole on the front 170 of the insert 150. The pin can engage the spring latches of the locking mechanism 160 at engagement point 262. Due to the relative geometry of the pin and the latches, the pin can force the latches to spread apart. Once the latches have spread sufficiently to clear the protrusion 110 channels 130 in the base 100, the insert 150 can be removed.

Alternatively, the button 150 may be flush with the surface, or slightly protruding. The button 150 may be further shielded from accidental depression by locating it behind the face surface of the insert, limiting access via a small hole in the face surface 170 of the insert 150. This can ensure the eject button is only activated by the insertion of an elongated thin metal object such as a small Allen key, an unfolded paperclip, or a piece of wire.

The button 210 may be spring-loaded 215. Depression of the button 210 can require a minimum force to operate. In one example, depression of the button 210 can push apart the latches 264 by pressing at location 262. The button shaft 210 can also press against the protrusion 110 of the base 100 in an example, assisting with detachment. Effectively, this can move the insert from the position shown in FIG. 2B to the position shown in FIG. 2A, in an example. In an alternate example, the button 210 can operate latches inside the central locating structure of the protrusion 110 on the inside of the base 100, which in turn retract the spring-loaded latches of the protrusion 110 on either side of the locating block. The insert 150 may then be removed by gripping the edge and pulling the insert 150, while keeping pressure on the eject button 210.

Thus, two diametrically opposed forces can be used to remove the insert 150 from the base 100—a first force pushing through the central button 210 in a first direction, and an opposite force pulling the insert 150 from the base 100.

Unlike prior solutions, the insert 150 can be released from the base 100 by means of one centrally located button, which operates two latches 264 within either the insert 150 or the base unit 110. The insert 150 or base 100 may include one or more springs, which compress when the insert 150 is being inserted. In this way, the insert 150 can pop partially out of the base 100 when the central button 210 is pressed.

To access the button 210, the insert 150 face plate 170 can include an opening, such as a pin hole or a keyhole. A custom tool may be inserted through the keyhole, depressing the button 210. In one example, the key can be rotated while the button 210 is held down, so that the key cannot be withdrawn. The same tool may then be used to withdraw the insert 150 from the base, by pulling on the key. In an alternate example (not illustrated), the insert 150 may include eject buttons on the sides of the insert 150 or base 100. Depressing the buttons on the sides of the insert 150 can work to release the mechanical locks between the insert 150 and the central locating projection 110 in the base 100. Likewise, the button 210 may be on the top, bottom or sides of certain inserts 150. The button 210 may be located anywhere on a non-planar surface of certain inserts 150 in some examples.

Example force values for disengaging the locking mechanism are shown below in Table 3.

TABLE 3

Force to disengage locking mechanism in assembled device

| Trial | Smart Outlet (N) | Dumb Outlet (N) | Dumb Switch (N) | Blank (N) |
| --- | --- | --- | --- | --- |
| 1 | 22 | 37 | 30 | 42 |
| 2 | 19 | 36 | 22 | 53 |
| 3 | 21 | 28 | 30 | 64 |
| 4 | 23 | 24 | 28 | 66 |
| 5 | 20 | 32 | 28 | 64 |
| 6 | 21 | 30 | 24 | 63 |
| 7 | 20 | 32 | 30 | 38 |
| 8 | 20 | 34 | 26 | 74 |
| 9 | 21 | 34 | 24 | 70 |
| 10 | 21 | 35 | 22 | 40 |
| Average | 20.8 | 32.2 | 26.4 | 57.4 |
| Min | 19 | 24 | 22 | 38 |
| Max | 23 | 37 | 30 | 74 |
| Std Dev. | 1.135292424 | 3.966526608 | 3.238655414 | 13.17573527 |

Figure 3:
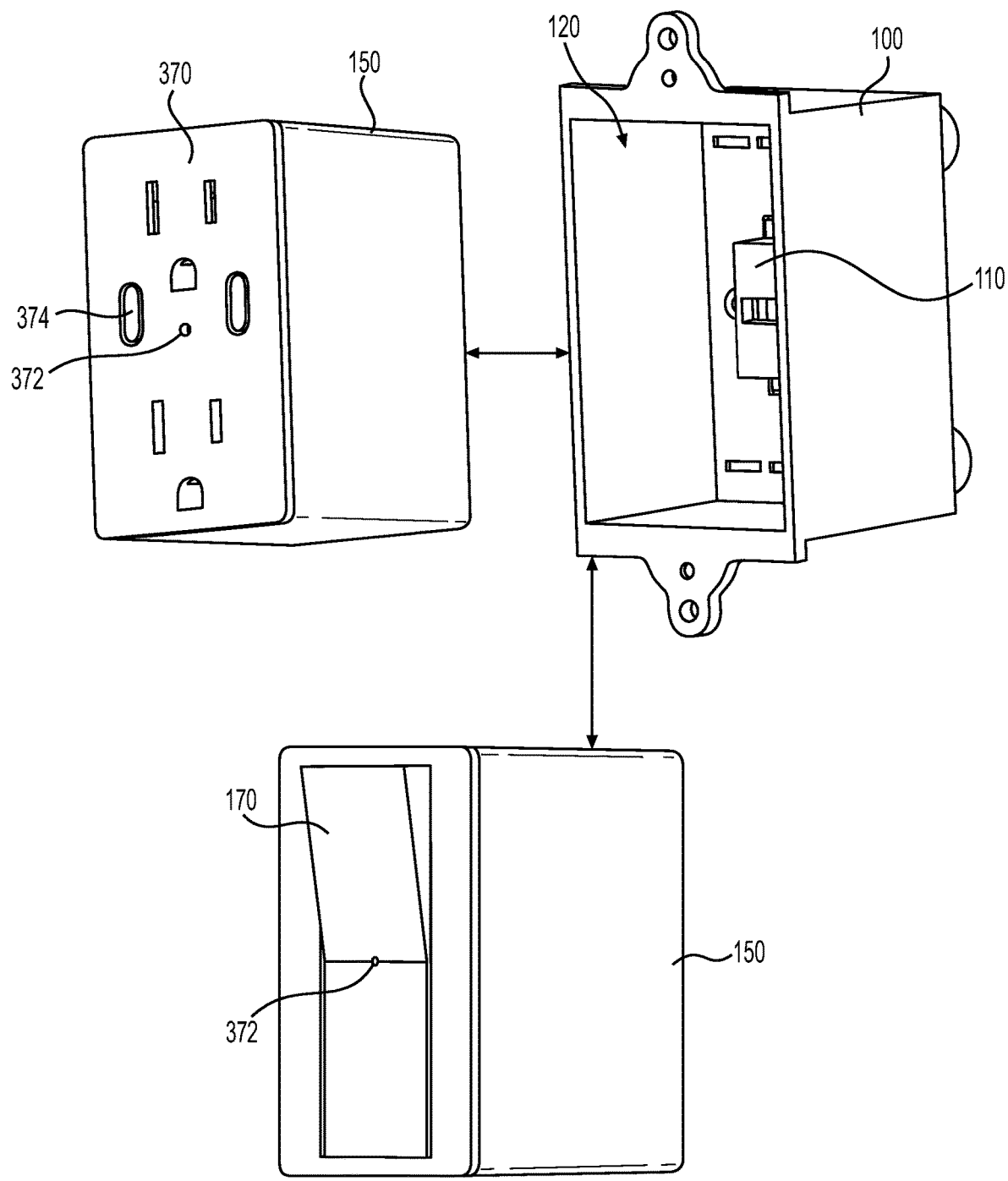
FIG. 3 is an example illustration of a modular system that includes a base, outlet insert, and switch insert.

FIG. 3 is an example illustration of a modular system that includes a base 100, outlet insert 150, and switch insert 150. In this example, the outlet insert 150 includes a face plate 370 with two standard electrical outlets. The switch insert 150 includes a face plate with a physical switch 170. Both inserts 150 include a button access hole 372 for pressing a button 210 that is recessed within the respective insert 150. The male locking mechanism 110 on the base 100 of this example includes an opening that can contain two spring-loaded latches. However, in another example, such as shown in FIGS. 2A and 2B, the locking mechanism 110 of the base 100 can be of the female variety.

Either insert 150 can be inserted into the base 100. Once inserted, the insert 150 may be flush or it may be recessed from the wall or ceiling. The insert 150 may also protrude from the plane of the wall or ceiling (where the base 100 is installed) or even extend along the plane. In the case of mounts for more bulky inserts 150, such as video cameras, directional microphones, small spotlights, or speakers, the insert 150 may protrude appreciably from the plane of the wall or ceiling.

Side wall dimensions of the insert 150 can be slightly smaller than the inner cavity 120 dimensions of the base 100. This can allow a small breathing space for thermal management, as well as to accommodate dimensional changes due to thermal expansion. Because the insert 150 may not be a snug fit in some examples, the locking mechanism 110 and mating with other structural ports 124 or access ports 122 can ensure that the insert is square and that the electrical pins 165 are correctly aligned with the outlets of the base 100.

The electrical pins 165 of the insert 150 can be different shapes to further avoid incorrect insertion. For example, the ground pin can be longer than the others to allow it to begin opening the tamper-resistant gates shuttering the electrical outlets inside the back of the base 100. The walls of the insert 150 may be solid, or they may be vented or louvered for thermal management purposes.

In the illustrated example, outlet insert 150 can include LED lights 374 to indicate which outlets are active. This outlet insert 150 can receive wireless communications from another insert that is being used with a different base 100. For example, a switch insert can communicate wirelessly with outlet insert 150 to control the supply of power to a plugged-in apparatus, such as a light or space heater. The switch insert can receive the signals and turn its outlets on and off accordingly. In another example LED lights 374 can instead be ports for charging devices, such as cell phones.

The system can also include multi-gang inserts 150 and/or multi-gang bases 100. For example, a single base 100 can include space for attaching several inserts 150 or one multi-gang insert. In such a situation, multiple locking mechanisms can be used with the base 100 to engage the multiple inserts 150 or the multi-gang insert 150. This can allow, for example, for a five-gang switch insert 150 to be used with a base 100, providing power to all five switches from the base 100. A single insert can also use multiple output ports 122 of the base 100, such that a single insert 150 can take up multiple gangs of a base. This can be the case, for example, with a touchscreen display insert 150 that is larger than a single gang. A digital thermostat insert 150 likewise could access a special thermostat control port 122 in the base while taking power from a different gang of the base and ethernet from sill another port 122 of the base. Similar multi-gang base 100 arrangements for use with a single insert 100 can be advantageous for a smart assistant insert, which may have a speaker, screen, and microphone.

In one example, the switch insert can take up multiple gangs of the base and provide a custom switch layout with multiple switches or even multiple types of switches. These switches can be assigned to different ports 122 of the base, in an example. This can allow for a combination of wired and wireless switches in a single insert, allowing the home owner to logically and conveniently group switches together at a single physical location without hiring a professional electrician.

Figure 4:
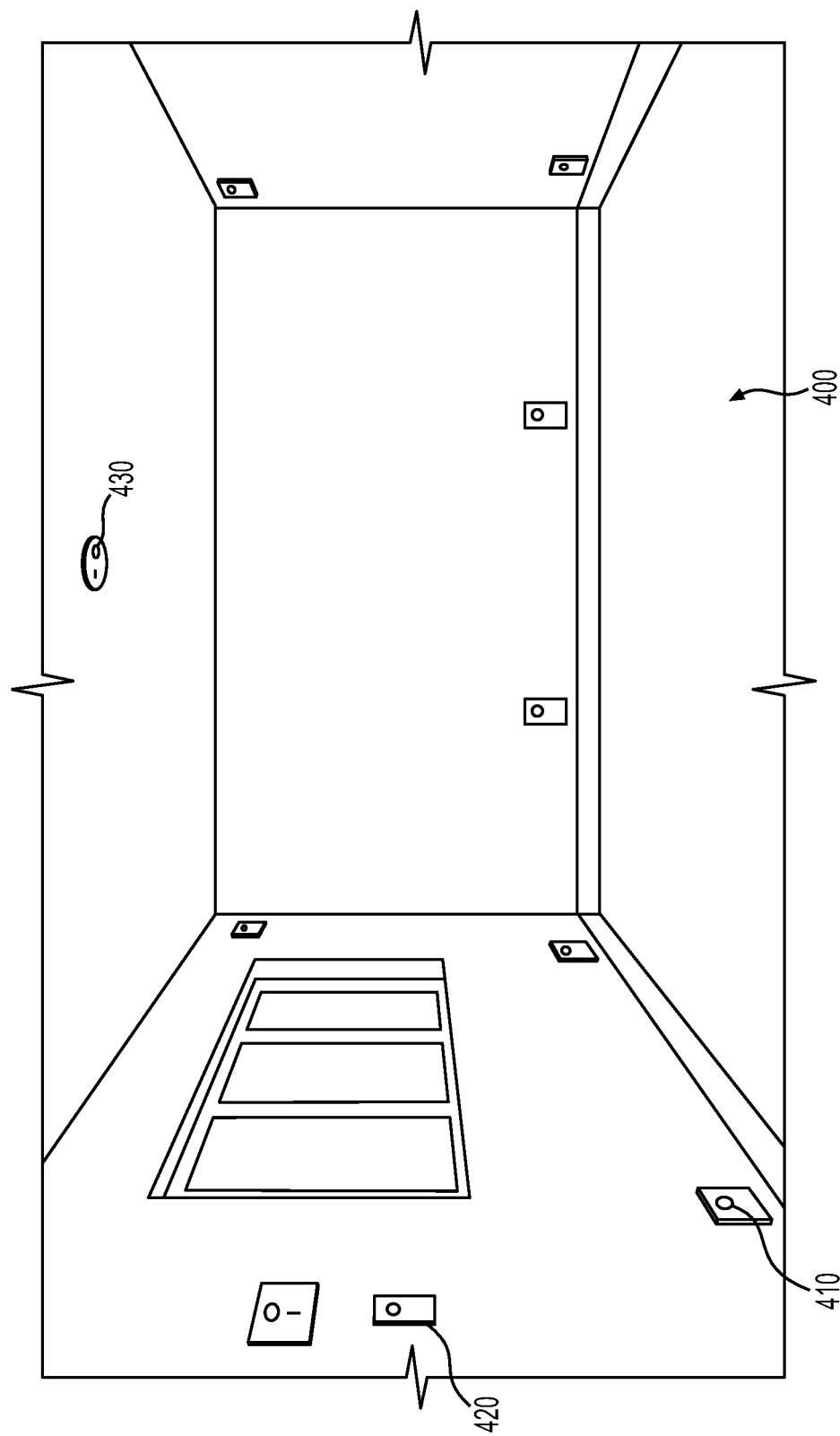
FIG. 4 is an example illustration of a room using a modular outlet system.

The switch and electrical outlet inserts 150 can be swapped in and out of the base 100 by the user without the need for professional help. FIG. 4 is an example illustration of a room 400 using a modular outlet system. As shown, various bases 410, 420, 430 can be installed throughout the room 400. The bases 410, 420, 430 can exist on walls, floors, or ceilings. An unused base 430 can be filled with a blank insert. Later, a user can remove the blank insert by pushing the button to release the latching mechanism. The user can then put any other insert, such as a light or a sensor, into that base 430.

In one example, the base 430 can act as a separate apparatus that is controlled by a switch insert 150 at some other location, such as at base 420. The switch insert 150 can be powered by base 420 and send a signal to a light insert located at insert 430, in an example. In this way, the switch insert 150 can control the supply of power (directly or wirelessly) of a separate apparatus, which in this example can be a light insert installed at base 430.

Figure 5:
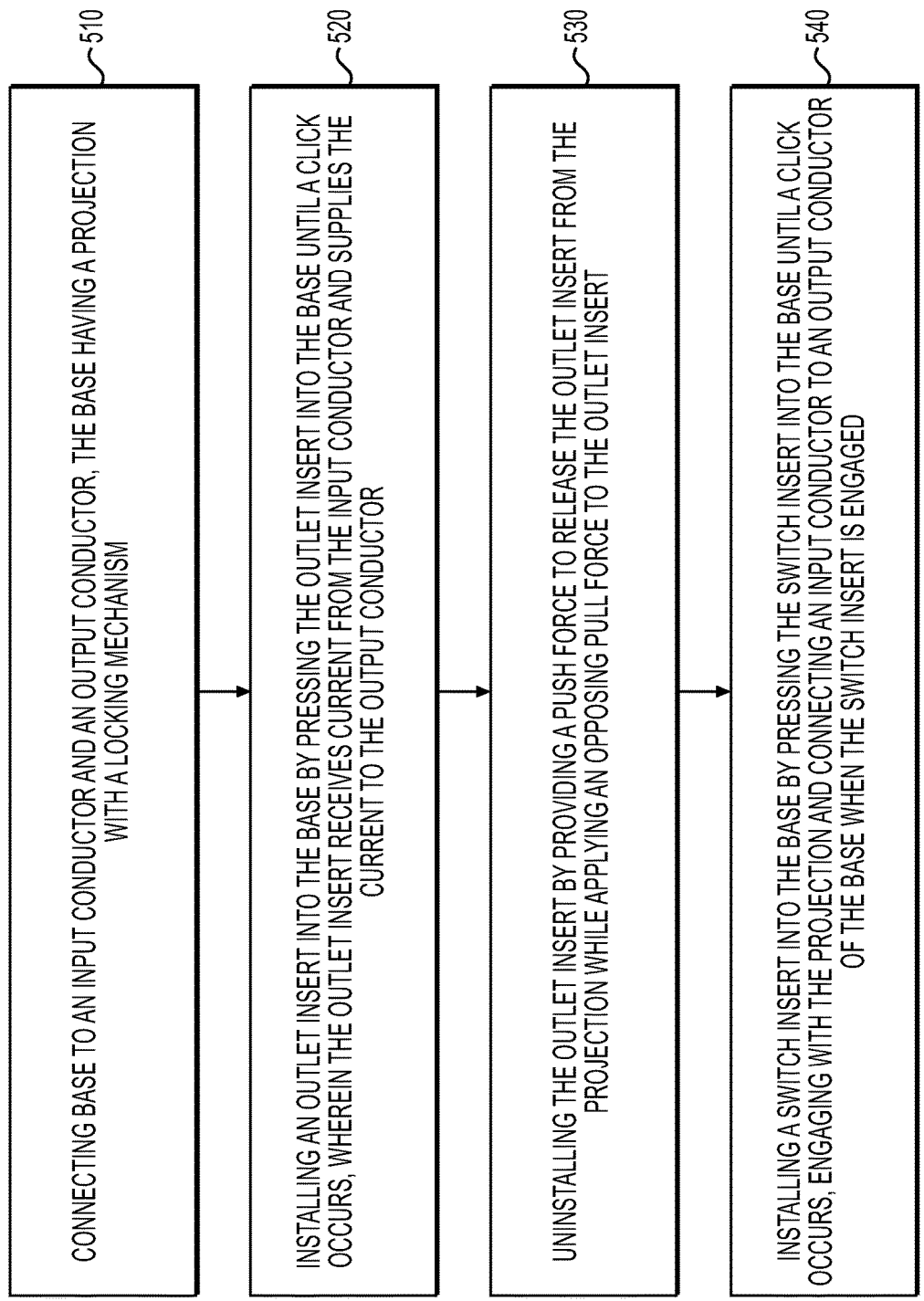
FIG. 5 is an example flowchart with steps for utilizing the modular system.

FIG. 5 is an example flowchart with steps for utilizing a modular electrical outlet system. At stage 510, an electrician or other user can connect a base to an input conductor and an output conductor, the base having a first locking mechanism. For example, the input conductor can be a hot line and the output conductor can be neutral. The first locking mechanism can be of the male or female variety. For example, it can be a female protrusion 110 with channels 130 for accepting latches 264 of the male locking mechanism 160 of an insert 150, in an example.

A user, such as a homeowner, can install multiple different insert types into the base 100 without profession assistance. For example, at stage 510, the user can install an outlet insert into the base 100 by pressing the outlet insert into the base until a click occurs. The click can indicate engagement of a second locking mechanism of the outlet insert with the first locking mechanism of the base. Upon engaging, the outlet insert can receive current from the input conductor and supply the current to the output conductor when an apparatus is plugged into the outlet.

At stage 530, the user can uninstall the outlet insert by providing a push force to unlock the spring-loaded latch. The spring-loaded latch can be part of the first or second locking mechanism, depending on the example. While the latch is unlocked, the user can apply an opposing pull force to the outlet insert to pull it free of the base 100.

At stage 540, the user can place a different insert 150 into the base 100. This can include installing a switch insert into the base 100 by pressing the switch insert into the base until a click occurs, wherein the switch insert connects the input conductor to an output conductor of the base when the switch is engaged.

The base 100 can include access ports for making electrical connections to the inserts 150. The electrical terminals can be shielded using gates. The gates can open during engagement of the insert 150. For example, a ground pin on the insert 150 can open the gates. Alternatively, the second locking mechanism 160 of the insert 150 or some other physical protrusion 167 can cause the gates to open. For example, insertion of a ground pin of the outlet insert and switch insert can cause the gates to expose the electrical terminals.

To lock an insert into place, the first locking mechanism (i.e., of the base) can include channels that mate with latches of the second locking mechanism (i.e., of the insert). In this example, the moving latches, springs, and other locking mechanism (e.g., button) hardware can be located in the insert 150.

However, the configuration can also be reversed, where latches reside in the base and operate to grab a protrusion of the insert. In the reversed configuration, the button (e.g., a pin) of the insert can still cause the latches of the base to open for disengagement purposes. In the alternate example, many of the moving parts of the locking mechanism are contained in the base 100, which is permanently mounted and wired in the wall. The mechanism can consist of two small, coil spring loaded, plates that moved in tandem with each other. The action of inserting a module into the base caused the plates to move towards the center, and when the module was fully inserted, the springs can push the plates away from center and engage cavities molded into the insert 150 to lock it into position. To release the insert 150, a tool can be used to press a release mechanism which brings the two plates (in the base 100) towards the center, which disengages them from the cavities and allows the user to remove the insert 150.

Though some of the described methods have been presented as a series of steps, it should be appreciated that one or more steps can occur simultaneously, in an overlapping fashion, or in a different order. The order of steps presented are only illustrative of the possibilities and those steps can be executed or performed in any suitable fashion. Moreover, the various features of the examples described here are not mutually exclusive. Rather any feature of any example described here can be incorporated into any other suitable example. It is intended that the specification and examples be considered as exemplary only, with a true scope and spirit of the invention being indicated by the following claims.

What is claimed is:

1. A modular electrical fixture system, the system comprising:
   a base that connects to a power supply, the base including an inner cavity that includes a locking mechanism, wherein the base includes electrical terminals shielded by gates;
   an outlet insert that mates with the base; and
   a sensor insert that mates with the base when the outlet insert is disengaged from the base, wherein the sensor insert includes at least one of a thermostat, a virtual assistant, a light sensor, a movement detector, and a moisture meter,
   wherein mating the outlet insert and mating the sensor insert to the base each causes the gates to expose the electrical terminals for contact with electrical pins of the respective outlet insert and switch insert.

2. The modular electrical fixture system of claim 1, wherein the locking mechanism includes a projection with an electrical terminal that the outlet insert engages while mated, wherein mating causes a neutral connector of the outlet insert to engage with the base prior to the electrical terminal engaging.

3. The modular electrical fixture system of claim 1, wherein the outlet insert includes a button to disengage from the locking mechanism of the base, wherein the button disengages the outlet insert from the base when a first force is applied in an opposite direction from a direction of removal of the outlet insert from the base.

4. The modular electrical fixture system of claim 1, further comprising a third insert that mates with the base and provides wireless power transfer.

5. The modular electrical fixture system of claim 1, wherein the sensor insert wirelessly controls the supply of power to the separate apparatus, and wherein the separate apparatus is another insert that is mated with another base.

6. The modular electrical fixture system of claim 1, wherein engaging the outlet insert to the base causes a ground pin to engage prior to neutral pin prior to an electrical pin of the outlet insert engaging with a live electrical terminal through an access port of the base.

7. The modular electrical fixture system of claim 1, wherein the outlet insert includes an alternating current outlet, and wherein a third insert that mates with the base includes a direct current outlet, and a fourth insert that mates with the base includes a low voltage USB outlet.

8. The modular electrical fixture system of claim 1, wherein mating the outlet and sensor inserts with the base causes a light to illuminate on the respective insert to indicate a successful mating.

9. The modular electrical fixture system of claim 8, further comprising a network connectivity insert that mates with the base when the sensor insert and outlet insert are both disengaged, the network connectivity insert providing device connectivity by at least one of Bluetooth, WiFI, ultrasound, or cellular service.

10. The modular electrical fixture system of claim 1,
    wherein the base is multi-gang and accepts multiple inserts simultaneously, and
    wherein the outlet insert and a third insert mate simultaneously with the base, the third insert having a different function than the outlet insert.

11. The modular electrical fixture system of claim 10, further comprising a thermal camera insert that mates with the base.

12. The modular electrical fixture system of claim 1, further comprising a smoke detector insert that mates with the base.

13. The modular electrical fixture system of claim 1, further comprising:
    a switch insert that mates with the base when the outlet insert and sensor insert are both disengaged from the base, wherein the switch insert controls a supply of power to a separate apparatus.

14. The modular electrical fixture system of claim 13, wherein the switch insert and sensor insert each include a pin for disengaging the respective insert, wherein the pin is spring loaded and operates a latch for disengaging with the locking mechanism in the base unit.

15. The modular electrical fixture system of claim 1, wherein the outlet insert includes a passthrough hole for accessing a keyhole of the locking mechanism in the base, wherein turning an object in the keyhole causes the locking mechanism to disengage.

16. The modular electrical fixture system of claim 1, wherein the base connects to an input conductor and an output conductor, wherein power is supplied to the input conductor, and wherein the switch insert includes a pin for supplying power to the output conductor from the input conductor when a switch of the switch insert is in an on position.

17. A method of using a modular electrical outlet system, the method comprising:
    connecting a base to an input conductor and an output conductor, the base having a first locking mechanism for engaging with multiple types of inserts, including a sensor insert, a switch insert, and an outlet insert, wherein the base includes gates that shield electrical terminals when none of the multiple types of inserts are engaged with the base;
    installing the outlet insert into the base by pressing the outlet insert into the base until a notification occurs;
    uninstalling the outlet insert by providing a push force to unlock a latch while applying an opposing pull force to the outlet insert;
    installing the sensor insert into the base by pressing the switch insert into the base;
    uninstalling the sensor insert from the base; and
    installing the switch insert into the base,
    wherein installing the outlet insert, sensor insert, and switch insert each cause the gates of the base to expose the electrical terminals for contact with electrodes of the respective outlet, sensor, and switch insert.

18. The method of claim 17,
    wherein insertion of a ground pin of the sensor insert causes the gates to expose the electrical terminals, and
    wherein the first locking mechanism includes channels that mate with latches of the sensor insert.

19. The method of claim 17, wherein the sensor insert controls operation of the outlet insert when the switch insert is engaged with the base and the outlet insert is engaged with a second identical base.

20. The method of claim 17, wherein the sensor insert includes at least one of a thermostat, a virtual assistant, a light sensor, a movement detector, a smoke alarm, and a moisture meter.

* * * * *